US009083634B2

(12) United States Patent
Mir et al.

(10) Patent No.: US 9,083,634 B2
(45) Date of Patent: Jul. 14, 2015

(54) METHOD FOR SUPPORTING CONGESTION MANAGEMENT IN A CONGESTION EXPOSURE-ENABLED NETWORK

(75) Inventors: Faisal-Ghias Mir, Heidelberg (DE); Dirk Kutscher, Heidelberg (DE); Giorgio Nunzi, Heidelberg (DE); Marcus Brunner, Leimen (DE)

(73) Assignee: NEC EUROPE LTD., Heidelberg (DE)

( * ) Notice: Subject to any disclaimer, the term of this patent is extended or adjusted under 35 U.S.C. 154(b) by 138 days.

(21) Appl. No.: 13/884,411

(22) PCT Filed: Nov. 10, 2011

(86) PCT No.: PCT/EP2011/069797
§ 371 (c)(1),
(2), (4) Date: May 9, 2013

(87) PCT Pub. No.: WO2012/062836
PCT Pub. Date: May 18, 2012

(65) Prior Publication Data
US 2013/0223219 A1    Aug. 29, 2013

(30) Foreign Application Priority Data

Nov. 10, 2010  (EP) .................................... 10014454

(51) Int. Cl.
*H04L 1/00* (2006.01)
*H04L 12/813* (2013.01)
*H04L 12/801* (2013.01)
*H04L 12/825* (2013.01)

(52) U.S. Cl.
CPC ................ *H04L 47/20* (2013.01); *H04L 47/11* (2013.01); *H04L 47/127* (2013.01); *H04L 47/14* (2013.01); *H04L 47/263* (2013.01)

(58) Field of Classification Search
CPC .... H04L 47/115; H04L 47/127; H04L 47/263
USPC .................................................. 370/232, 235
See application file for complete search history.

(56) References Cited

U.S. PATENT DOCUMENTS 6,741,555 B1 *   5/2004   Li et al. ......................... 370/229
8,009,568 B2     8/2011   Pinter et al.
(Continued)

FOREIGN PATENT DOCUMENTS

EP          2090035          8/2009

OTHER PUBLICATIONS

International Search Report dated Feb. 3, 2012, corresponding to PCT/EP2011/069797.
(Continued)

*Primary Examiner* — Wanda Z Russell
(74) *Attorney, Agent, or Firm* — Young & Thompson (57) ABSTRACT

A method for supporting congestion management in a congestion exposure-enabled network, wherein sending hosts and receiving hosts communicate with each other by sending flows of packets over network paths via intermediate routers, which, upon detecting congestion, mark packets of the flows as congestion packets by including congestion information, wherein congestion is indicated to the sending hosts via a congestion feedback mechanism, and wherein the sending hosts, upon receiving congestion indications, declare a subset of the packets they send as congestion response packets by including congestion information, depending on whether the amount of congestion response packets is balanced with the indicated congestion level or not is characterized in that aggregated congestion is determined on the basis of congestion information included in packets that are sent over the network paths between the sending hosts and the receiving hosts. Furthermore, a corresponding congestion exposure-enabled network system and a corresponding intermediate router are disclosed.

19 Claims, 4 Drawing Sheets

(56) References Cited

U.S. PATENT DOCUMENTS

| 2003/0120796 A1* | 6/2003 | Shin | 709/235 |
| 2006/0104298 A1* | 5/2006 | McAlpine et al. | 370/412 |
| 2011/0032935 A1* | 2/2011 | Yang | 370/389 |
| 2011/0182194 A1 | 7/2011 | Jacquet et al. | |

OTHER PUBLICATIONS

Diana Remi, et al.; ECN Verbose Mode: A Statistical Method for Network Path Congestion Estimation; Mar. 15, 2010; pp. 1-5.

Briscoe BT R Woundy Comcast T Moncaster B et al; ConEX Concepts and Use Cases; draft moncaster-conex-concepts-uses-01.txt; Jul. 12, 2010; pp. 1-29.

Moncaster L Krug BT M Menth University of Wuerzburg Jaraujo UCL S Blake Extreme Networks R Woundy T et al; "The Need for Congestion Exposure in the Internet; draft-moncaster-conex-problem-00,txt"; Mar. 2, 2010; pp. 1-22.

Briscoe et al.; Policing Congestion Response in an Internetwork Using Re-Feedback; Aug. 21-26, 2005; pp. 1-12.

Sally Floyd, et al; "Random Early Detection Gateways for Congestion Avoidance"; Aug. 1993; pp. 1-22.

* cited by examiner

METHOD FOR SUPPORTING CONGESTION MANAGEMENT IN A CONGESTION EXPOSURE-ENABLED NETWORK

The present invention relates to a method for supporting congestion management in a congestion exposure-enabled network, wherein sending hosts and receiving hosts communicate with each other by sending flows of packets over network paths via intermediate routers, which, upon detecting congestion, mark packets of said flows as congestion packets by including congestion information, wherein congestion is indicated to the sending hosts by means of a congestion feedback mechanism, and wherein the sending hosts, upon receiving congestion indications, declare a subset of the packets they send as congestion response packets by including congestion information, depending on whether the amount of congestion response packets is balanced with the indicated congestion level or not.

Furthermore, the present invention relates to a congestion exposure-enabled network system, said system comprising sending hosts, receiving hosts and intermediate routers, wherein said sending hosts and said receiving hosts communicate with each other by sending flows of packets over network paths via said intermediate routers, which, upon detecting congestion, mark packets of said flows as congestion packets by including congestion information, wherein a congestion feedback mechanism is provided being configured to indicate congestion to the sending hosts, and wherein the sending hosts, upon receiving congestion indications, declare a subset of the packets they send as congestion response packets by including congestion information, depending on whether the amount of congestion response packets is balanced with the indicated congestion level or not.

Finally, the present invention relates to an intermediate router for use in a congestion exposure-enabled network, wherein sending hosts and receiving hosts communicate with each other by sending flows of packets over network paths via said intermediate router, wherein, upon detecting congestion, said intermediate router is configured to mark packets of said flows as congestion packets by including congestion information, wherein a congestion feedback mechanism is provided being configured to indicate congestion to the sending hosts, and wherein the sending hosts, upon receiving congestion indications, declare a subset of the packets they send as congestion response packets by including congestion information, depending on whether the amount of congestion response packets is balanced with the indicated congestion level or not.

BACKGROUND OF THE INVENTION

Congestion-based network traffic policing based on congestion exposure is a promising network resource control paradigm that accounts for user traffic in the event of network congestion. It has been argued, for example in B. Briscoe, "Flow Rate Fairness: Dismantling a Religion", ACM Computer Communications Review, 37(2), 63-74 (April 2007), that flow rate fairness, which has been used in the past, is not a reasonable mechanism for resource allocation and accountability of network resources. Instead, it is suggested that a cost-based mechanism would provide a better resource allocation paradigm, in which "cost" means the degree to which each user's transfers restrict other transfers, given the available network resources. The metric that has been suggested for measuring this cost is the volume of network congestion caused by each user. A network traffic policing mechanism based on congestion offers a net-neutral way for network operators to manage traffic on their networks.

There have been several proposals for implementing congestion-based network traffic policing. For example, Re-ECN (Relay or Re-feedback of Explicit Congestion Notification) is a proposal that has been made in the Internet Engineering Task Force (IETF) Congestion Exposure (CONEX) Working Group, being described, for example, in B. Briscoe, A. Jacquet, C. Di Cairano-Gilfedder, A. Salvatori, A. Soppera, and M. Koyabe, "Policing Congestion Response in an Internetwork using Re-feedback", Proc. ACM SIGCOMM'05, CCR, 35(4):277-288, August 2005. As will be discussed in greater detail below, Re-ECN, or re-feedback of explicit congestion notification provides a feedback mechanism through which packets expose the congestion that they expect to cause. The key feature is the user based accountability that is not based on resource usage but on the congestion user traffic is causing to others in a network. It is important to note that Re-ECN is one way of doing Congestion Exposure mechanism and alternatives are also possible.

Figure 1:
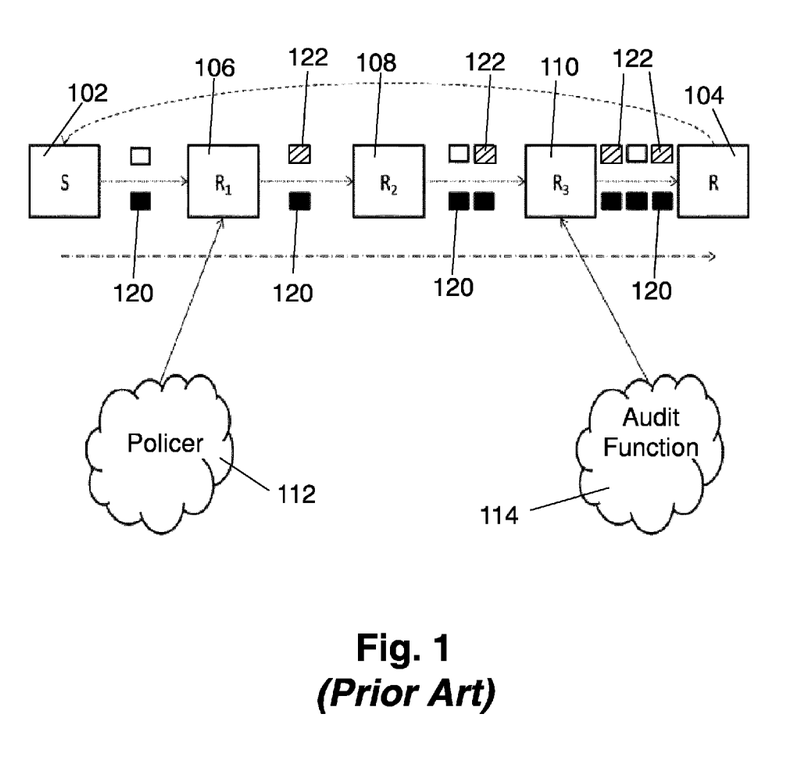
FIG. 1 shows an overview of a previously known Congestion Exposure framework.

For instance, in a Re-ECN system as shown in FIG. 1, which is a specific implementation of a congestion exposure system, there are different functional entities: routers detect congestion and apply Explicit Congestion Notification (ECN) to packets in their queue. Receiving endpoints collect this congestion information and relay it back to the sender. The sender runs a transport protocol (for instance TCP) and can use this information for the congestion control algorithm of a transport protocol. Also, the sender is expected to re-act to the received feedback declaring its contribution to congestion for subsequent packet transmissions. This is done by marking a certain fraction of packets appropriately. An operator-provided Congestion Exposure aware Policer can use this information to police or to account for traffic accordingly.

Thus, the Congestion Exposure approach is based on the idea that senders adapt to congestion indications from the network, for instance by decreasing TCP sending rates, and that senders declare their current congestion contribution to the network, which enables the network, e.g. routers, hosts, policers etc., to see the current congestion on a path. For instance, such information can be used to police traffic based on its congestion contribution according to some operator policy.

Since such policing can result in charging or other operator measures, users are normally not interested to over declare their current congestion contribution. In the Congestion Exposure framework, there are additional entities in form of an Audit Function that can enforce that congestion contribution is also not under declared in order to avoid non-conformity, e.g. cheating. In case non-conformity is detected, an Audit Function would normally start dropping packets of identified non-conformant flows to enforce a sending rate reduction for that particular flow. In summary, in Congestion Exposure, it is important for senders to declare their congestion contributions to the network correctly.

Furthermore, this approach does work in different scenarios, e.g. in fixed or mobile communication scenarios. For incorporating Congestion Exposure into mobile communication networks, a major challenge is to handle path changes caused by new network attachments. There are essentially two main issues:

Associating with a new wireless access point that changes the paths for current flows to/from a mobile node. The new paths may exhibit a lesser or greater congestion, but the current sending behavior and the current congestion declaration is based on earlier received feedback and may not match the new paths' conditions. In particular, if a mobile user moves to a higher congestion region, he may inadvertently create deficit at the egress Audit Function that in turn may classify that particular subset of traffic as non-conformant.

When multiple access networks are available for a handover decision, the mobile node has currently no means to select the most optimal one with respect to average path congestion. Some mobility architectures base handover decision on current access point load, but that is not sufficient if the congestion is occurring at different locations in the path.

In view of the above, it is therefore an object of the present invention to improve and further develop a method of the initially described type for supporting congestion management in a congestion exposure-enabled network in such a way that, by employing mechanisms that are readily to implement, mobile users have an improved quality of experience in the context of handling path changes in events of mobility.

SUMMARY OF THE INVENTION

In accordance with the invention, the aforementioned object is accomplished by a method comprising the features of claim 1. According to this claim, such a method is characterized in that aggregated congestion is determined on the basis of congestion information included in packets that are sent over said network paths between said sending hosts and said receiving hosts.

Furthermore, the aforementioned object is accomplished by a congestion exposure-enabled network system comprising the features of claim 17. According to this claim, such a system is characterized in that said network system is further configured to determine aggregated congestion on the basis of congestion information included in packets that are sent over said network paths between said sending hosts and said receiving hosts.

Finally, the aforementioned object is accomplished by an intermediate router comprising the features of claim 18. According to this claim, such an intermediate router is characterized in that said intermediate router is further configured to determine aggregated congestion on the basis of congestion information included in packets that are sent over said network paths via said intermediate router between said sending hosts and said receiving hosts.

According to the invention it has first been recognized that an improved quality of experience for mobile users in the context of handling path changes may be realized by considering exposed congestion information. Specifically, according to the invention, aggregated congestion is determined on the basis of exposed network path congestion information. That means, that aggregated congestion can be computed on the basis of congestion information included in data packets that are sent over a path between a sending host and a receiving host. Instead of looking at fine granularity of actual physical paths, congestion information available in data packets, e.g. in congestion packets and/or congestion response packets, is exploited and the congestion information is aggregated based on involved network elements, e.g. intermediate routers, on the path within an operator domain for either direction of traffic. Thus, by using the aggregated congestion mobile users can be assisted in such a way that a timely and safely adjusting congestion response at the end host in advance is enabled and therefore mobile users have a better quality of experience while being mobile. As a result, mobile nodes can be assisted in path changes especially in mobility events for optimizing quality of experience in mobile scenarios.

According to a preferred embodiment the aggregated congestion may be determined by calculating a fraction of congestion marked packets. For a single node, e.g. router, eNodeB, etc., an aggregation mechanism may be provided for calculating the fraction of congestion marked packets in the downlink direction.

Additionally or alternatively, the aggregated congestion may be determined by summing up a number of congestion marked packets over a predefined time period, in particular in the downlink direction.

Consequently, this coarse grain calculation may enable an overall estimate of congestion that a set of end hosts that may be designated as mobile nodes are experiencing in the downlink direction. The calculation is coarse grained since it is independent of application, communication partner, path, topology, etc. For the uplink direction, such a calculation may be delegated to a node towards the edge of the network, for example a gateway.

Advantageously, the congestion information may include Re-ECN-specific markings. Thus, the congestion information may be retrieved from data packets by looking at Re-ECN specified protocol fields.

In a preferred embodiment, it may be provided that a path congestion prediction regarding the expected congestion level on a path is derived from the aggregated congestion, in particular by calculating a path congestion prediction factor. Thus, mobile node response to congestion and handover decisions in the mobile communication network can be improved.

Advantageously, network-generated hints may be provided, wherein the hints include the path congestion prediction.

Furthermore, the network-generated hints may be disseminated to network elements and/or end hosts. Network elements include e.g. intermediate routers, access points or any node between two end hosts. Thus, congestion information can be spread within the network and to end hosts, e.g. mobile nodes that are using the network resources. Therefore, a better network utilization is enabled and a better performance by limiting congestion contribution by mobile users can be achieved.

With respect to improving quality of experience for mobile nodes that may be designated as end hosts, the network-generated hints may be employed for assisting the hosts in events of mobility, in particular during handover events. In the context of Congestion Exposure that is a congestion based policing mechanism where transport protocol instances can also take user preferences into account, a possible reaction when a mobile node enters a new cell and receives the network-generated hint that this cell is heavily congested, it might decide to not continuing with data traffic of a specific application starting from a configurable congestion level. For example in case the congestion hint is being larger than a threshold.

In an advantageous embodiment the network-generated hints may be employed for adjusting congestion response at the end hosts. A possible and relevant optimization of reacting on this hint mechanism is assisting mobile nodes for adjusting their congestion response when they are moving from one access point to another one. Through this systematic approach, information is provided to the mobile nodes about expected congestion levels before they actually send their first set of data packets. So based on that hint, the mobile nodes may decide to send more or less packets to the network and therefore more quickly adapt to the expected congestion level, before they actually start receiving congestion notifications from the receiver and therefore also might overload the network to a lesser extent. It is noted that the Audit Function functionality as foreseen in a Congestion Exposure environment maintains an invariant that congestion response packets should have an impact greater than that of congestion packets. So when the adaptation of a communication is too slow it might cause high number of drops and downgrade throughput heavily for the time until the end-system has adapted to the right level of sending rate.

Advantageously, the network-generated hints may be disseminated to mobility management entities in order to influence the mobility management decisions. For example, the hints may be used to decide about a particular attachment point. So the mobility management functionality, e.g. either in the mobile node in case of mobile IP based mobility schemes or at the 3GPP MME in 3GPP cases, may receive the hint about congestion level and may decide to move a mobile node or not to move, depending on that information. It is noted the difference to load based mobility management schemes, which try to optimize for getting equal load for a single component, whereas this proposed scheme tries to guess with a heuristic the congestion of all mobile nodes using different end-to-end paths in the network and takes therefore the overall situation into account and only reacts in case of congestion, but can also react on the different congestion levels.

Advantageously, the generation of the network-generated hints may be isolated among individual network elements, e.g. routers, for constructing a local congestion view indicating congestion between a subset of nodes on a path.

According to a preferred embodiment, the local congestion view may be represented as fraction.

According to a further preferred embodiment local congestion views for subsets along the path may be combined to generate a global congestion view in order to predict congestion for the complete path.

According to a still further preferred embodiment accuracy information regarding the computation of the network-generated hints may be signaled together with the hints.

Advantageously, the communication of the network-generated hints may be performed by exchanging the hints on the air interface of a network element, e.g. of an eNodeB, to the interface of a host, e.g. a mobile node.

Furthermore, it may be provided that the communication of the network-generated hints may be performed by employing ICMP (Internet Control Message Protocol) control messages.

BRIEF DESCRIPTION OF THE DRAWINGS

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained. In the drawings

DETAILED DESCRIPTION OF THE PREFERRED EMBODIMENTS

FIG. 1 shows an overview of the Congestion Exposure framework, and its functional entities. Congestion Exposure is described, for example, in B. Briscoe, A. Jacquet, C. Di Cairano-Gilfedder, A. Salvatori, A. Soppera, and M. Koyabe, "Policing congestion response in an internetwork using re-feedback", Proc. ACM SIGCOMM'05, CCR, 35(4):277-288, August 2005.

As shown in FIG. 1, a sender 102 (e.g., a TCP sender) and a receiver 104 (e.g., a TCP receiver) communicate over a path that includes routers 106, 108, and 110, as well as a policer 112 and an Audit Function 114. For the sender 102 and the receiver 104, the path can exhibit different characteristics with respect to delay, packet loss or "Congestion Experienced" (CE) marking rate due to transient or persistent congestion. Routers, such as the routers 106, 108, and 110, implementing active queue management (AQM) mechanisms probabilistically set the explicit congestion notification (ECN) bits (using random early detection (RED)) in the IP packets, such as packets 122 indicated by the shaded rectangles, when they detect incipient congestion. The receiver 104, upon receiving congestion marked packets, such as the packets 122, notifies the sender about the current congestion level through its transport protocol's feedback mechanism, e.g., using TCP header fields. The sender 102 then reacts to received congestion indications by adapting the sending rate according to the congestion control mechanisms of the specific transport protocol, and by declaring a fraction of the IP traffic sent on this connection as its congestion contribution to the network, by placing re-echo information in packets sent, such as congestion response packets 120 indicated by the filled rectangles, with the goal of balancing the number of "negative" bytes, i.e. the congestion contribution as reported by congestion feedback, with the number of "positive" bytes, i.e. the congestion contribution response as declared by the sender.

Thus, the basic principle of Congestion Exposure is to re-insert information on the experienced congestion back into the network. This allows an ingress policer 112 to decide what a user is entitled to in terms of allowed congestion according to network policies. In contrast, an Audit Function 114, which is implemented as packet dropper, validates what is being declared in correct or not and, as the case may be, drops packets in flows that persistently declare negative downstream congestion (i.e., that under-declare their congestion contribution).

Operators may choose to place the policer 112 at the network ingress, e.g., for rate-limiting the congestion that a user is allowed to cause in a given time period or for applying certain accounting schemes. Once a pre-configured quota is consumed, certain types of penalties are possible, e.g. imposing a decrease in service rate. It should be noted that the ingress policer 112 only rate limits the declared congestion. Therefore, there is still a possibility that understating the congestion may lead to a higher bit rate corresponding to an increase in utility. For the honest users, the response and congestion fractions should cancel out each other at the egress. It is not true for the users that are understating the congestion and their traffic eventually experiences a net deficit at the egress. Therefore, the Audit Function has been proposed to be the last entity in the path for penalizing the non-conformant flows.

Since traffic between hosts is bi-directional, after negotiating Congestion Exposure capability during connection setup each end point maintains a local 3-bit counter for recording CE events for that half of connection. The counter at the sender is designated as a local one whereas the one at the receiver is designated as the remote counter. The scheme is symmetric for the other half of connection. During congestion, the local counter at the receiver is incremented on each CE packet arrival. The receiving host updates the remote sender on the very next acknowledgement through its transport support. On each arrived acknowledgement, a sender compares its local counter value with the new value and records the difference. The difference is debit (congestion response packets 120 indicated by the filled rectangles) that a user owns traffic to the network.

In the context of Congestion Exposure, it is the responsibility of the transport protocol instance to adapt to changing path (network) conditions. Since Congestion Exposure should work with any transport protocol, the mechanism of path adaptability is orthogonal to any congestion control mechanism implemented at the end point.

Additionally for adjusting response, a transport protocol instance estimates two parameters from arriving acknowledgements:

Path congestion estimation

Error Correction in response since congestion is not static, i.e. it changes dynamically.

Initially both congestion estimate and error correction are unknown to the sending host, therefore it can be safely stated that feedback state is stale. In stale state, a sender uses pre-credits in the forward path until it starts receiving acknowledgements on the back channel. Each acknowledgement carries congestion information that a receiver is recording. Further, it can be argued that after receiving e.g. "n" acknowledgements, sufficient knowledge about the path state is captured.

For window based transport like TCP, n=1 is a special case of the above generalization and state transition may be made with the very first arriving acknowledgement. Since TCP is "ack" driven, the path state can be tracked from so far received acknowledgements and then based on that estimate error correction in response can be applied. The motivation for error correction is twofold. First, there is a lag between forward and feedback channel which not necessarily cancel out congestion and response packets at egress. Moreover, path congestion is not stationary as recorded in the last round trip time (RTT); therefore the estimate at the sender has some error in it. For each send operation, a sender has an estimate of observed path congestion and based on that estimate it further estimates how much congestion it should expect when acknowledgements of those packets will arrive. The response packets are sent in one to one correspondence of CE packets. By keeping track of congestion window and post-credits issued so far, a sender ensures that it has sufficient balance in forward path for safely passing through the Audit Function at the network egress.

According to Bob Briscoe, Arnaud Jacquet, Toby Moncaster, and Alan Smith, "Re-ECN: Adding accountability for causing congestion to TCP/IP", Internet Draft http://tools.ietf.org/id/draft-briscoe-tsvwg-re-ecn-tcp-08.txt, Internet Engineering Task Force, September 2009, it is also recommended by the protocol designers that on events of inactivity for a pre-configured time period (t≥1 sec) the feedback information at the sender should be discarded. It is also depicted as a transition that takes the connection into feedback stale state.

On a given path, the primary functionality of the Congestion Declaration Controller is intelligently setting Congestion Exposure code-points (pre-credits, post-credits) for outgoing traffic while adapting user sending rate (ramping up and down) on a given path with certain path characteristics.

At transport level e.g. TCP, the maximum number of packets unacknowledged in the network is driven by the congestion window size at any time in execution. Initially a sender starts with a minimal congestion window size, e.g. one, and in slow start it ramps up its sending rate (increasing window size) with each arriving acknowledgement (the ramp up of the window depends upon the TCP variant used). On average, after slow start phase, the congestion window is increased by one after a single RTT. For any strategy, to safely pass through functional entities, it is intelligently setting this number of code-points in either of TCP ramping up phases such that deficit at the egress should be less than the sum of pre-credit and post-credit packets.

Figure 2:
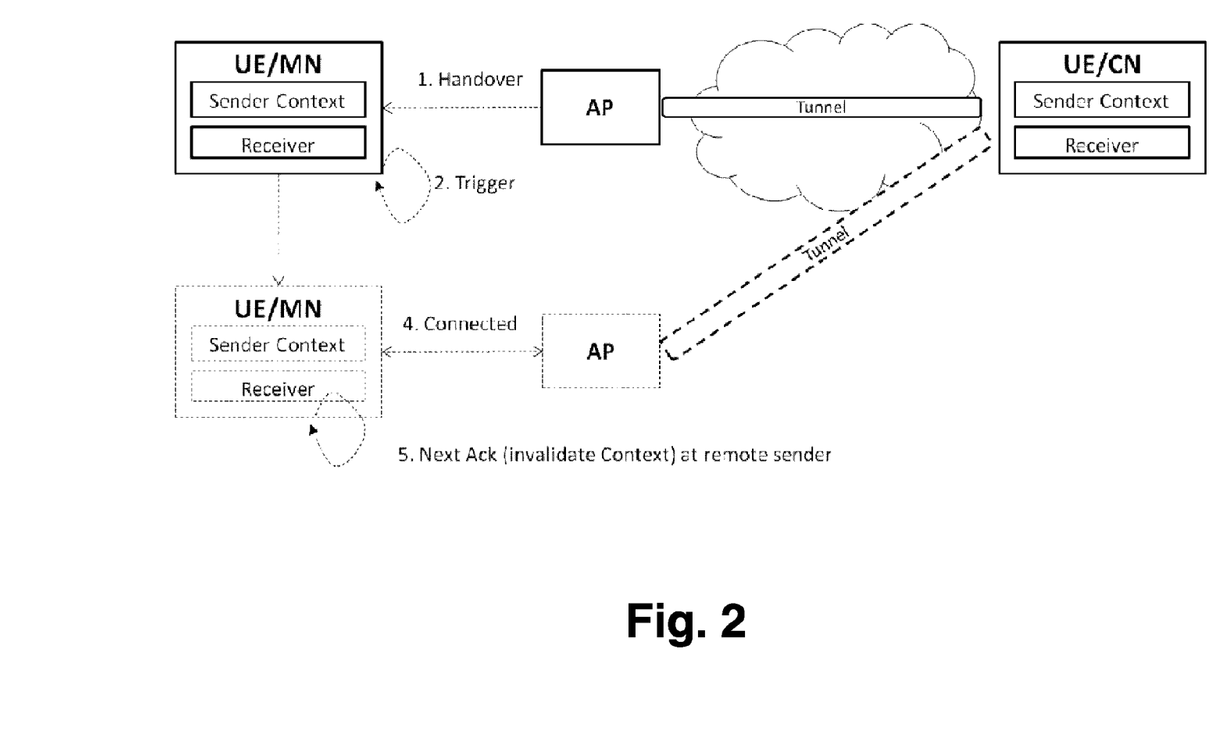
FIG. 2 is a schematic view illustrating a path change due to handover events.

With the introduction of mobility, e.g. handover as shown in FIG. 2, instead of focusing on path adaptability, issues related to the path changes have to be addressed especially for a larger congestion window size. FIG. 2 shows as user equipment functioning as mobile node UE/MN which communicates via an access point AP with another user equipment functioning as corresponding node UE/CN. Especially for seamless mobility, a user has no knowledge of expected level of congestion before-hand on the new path. The path adaptability can only happen after a user has received acknowledgements of data packets that it actually transmitted over the new path. These newly arriving acknowledgements carries path view due to changes in offered load introduced by the newly added traffic burst. The challenge is how to set packet code-points, e.g. for indicating congestion, for the very next traffic burst that will occur after a change in attachment point has happened.

Specifically for end points in events of mobility as illustrated in FIG. 2, the following issues have to be addressed:

The state of new path (congestion, load etc) is not known reliably

How to make a reasonable estimate about expected congestion level?

Estimation of how much of path has actually been changed (depends on scenario, e.g. in 3GPP)

Figure 3:
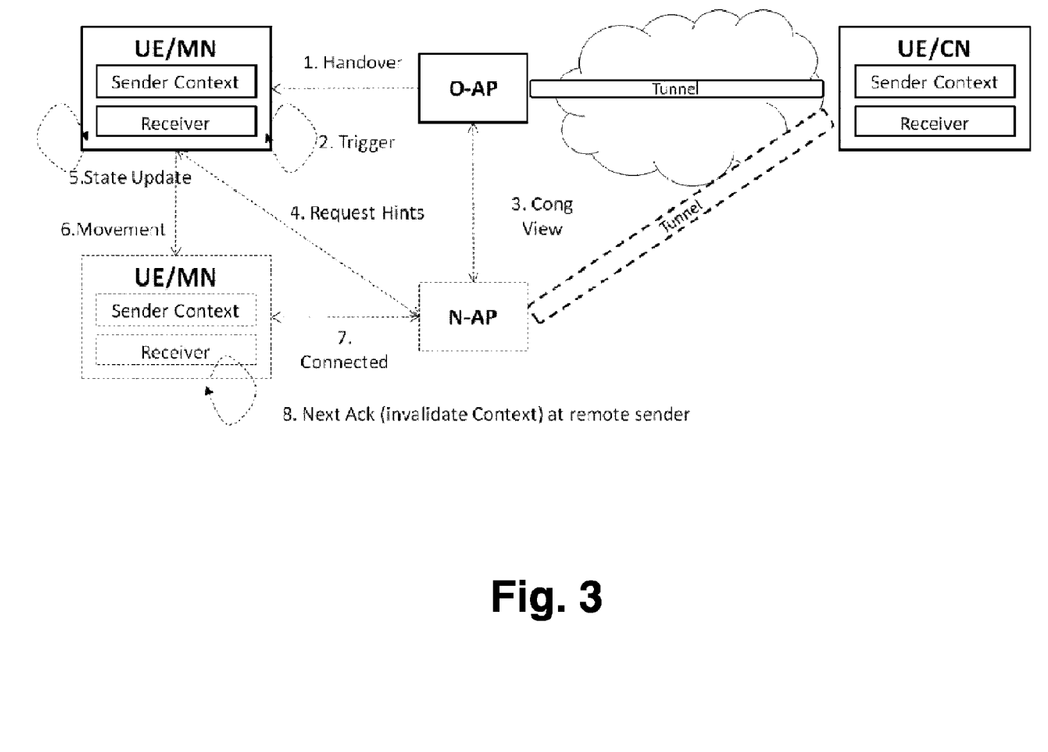
FIG. 3 is a schematic view illustrating an example of an application scenario of a method according to the present invention.

The feedback loop is kind of unreliable due to in-flight packets and acknowledgements The newly arriving feedback might be stale (not reliable) because we are not sure that acknowledgements followed the old or new path For seamless mobility, the selection of code-points for the very next packets that depends on current window size The sender must also take into account the length of handover time, because it should not be more than idle time events FIG. 3 is a schematic view illustrating an example of an application scenario of a method according to the present invention. A mobile node UE/MN is moved from the old access point O-AP to the next attachment point, i.e. the new access point N-AP. At the new access point N-AP the rest of the path for the mobile node UE/MN remains the same, the prediction factor is only the difference between the marking rate of the old access point O-AP and the new access point N-AP. This information can be exchanged between the two access points, e.g. over the X2 interface in LTE case, and during the handover procedure the new access point N-AP makes this information available to the mobile node UE/MN.

Thus, a path congestion prediction factor is calculated that is passed on to the mobile node UE/MN upon the handover event.

Figure 4:
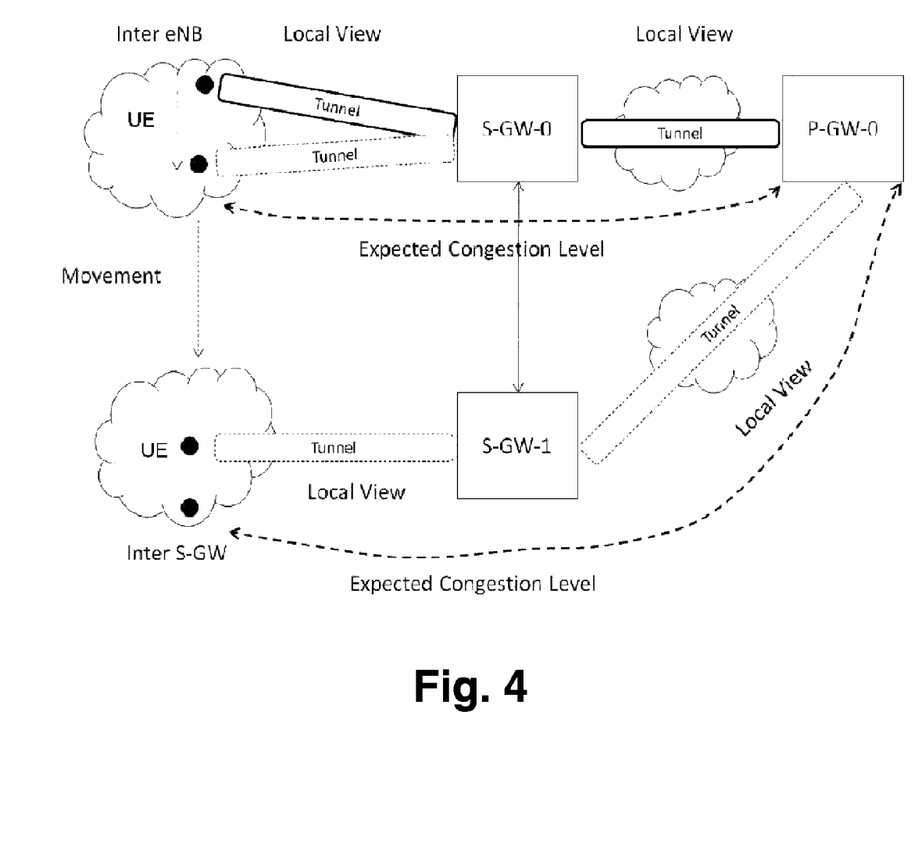
FIG. 4 is a schematic view illustrating an example of another application scenario of a method according to the present invention.

FIG. 4 is a schematic view illustrating an example of another application scenario of a method according to the present invention.

Possible paths from within an operator domain are limited. Instead of looking at fine granularity of actual physical paths, congestion information available in data packets is exploited and it is aggregated based on involved network elements on a path within an operator domain for either direction of traffic.

By isolating hint calculation mechanism among individual network elements a Local Congestion View between a set of nodes on the path is constructed. The paths in the operator domain are multiplexed therefore for predicting expected congestion on a new path, the local congestion along these individual set of paths is aggregated to construct hints that are designated as the Global Congestion View.

FIG. 4 shows a possible scenario for having the need of a Global Congestion View. Two handover situations are shown that are inter-eNodeB and inter-SGW (Serving Gateway) handovers. The inter-eNodeB case is a simple one since the difference in congestion can be captured through the local view, e.g. through the difference between marking rate on the eNodeBs.

However for the inter-SGW scenario, the network has to combine congestion information that is occurring between S-GW-1 and P-GW-0 (Packet Data Network Gateway) for calculating the prediction factor for congestion on the new (changed) path. The motivation combining such information is due to the reason that congestion from S-GW-1 to P-GW-0 is not known reliably at the attachment point.

In the context of Congestion Exposure, congestion signifies the cumulative marking rate across all resources (bottlenecks) along the path. A simplistic approach is representing congestion as fraction (%) along a subset or complete path between communicating end points. Fractions along subset of paths may then be combined to construct a Global View of congestion in predicting traffic for the complete path.

The accuracy of prediction may depend on factors like time scales on which information is exchanged among various network elements in the operator domain. Or the accuracy might be inferred based on statistical changes of the marking fraction etc. However, it is foreseen that the accuracy of the computed network-generated hint is signaled together with the network-generated hint itself and let the recipient of the hint make a decision on how it would react on it and how serious he takes this hint into account.

The communication of the hint can be done in various ways. A possible instance is exchanging congestion information on the air interface on the eNodeB to mobile node interface. Other examples could be through ICMP control messages, piggy-backing it to the signaling messages like the mobility management signaling (mobile IP or 3GPP mobility signaling protocols).

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for supporting congestion management in a congestion exposure-enabled network, comprising:
    sending flows of packets over network paths between sending hosts and receiving hosts via one or more intermediate routers; and
    upon detecting congestion, marking packets of said flows as congestion packets by including congestion information,
    wherein congestion is indicated to the sending hosts by means of a congestion feedback mechanism, and
    wherein the sending hosts, upon receiving congestion indications, declare a subset of the packets they send as congestion response packets by including congestion information, depending on whether the amount of congestion response packets is balanced with the indicated congestion level or not,
    wherein aggregated congestion is determined on the basis of congestion information included in packets that are sent over said network paths between said sending hosts and said receiving hosts,
    wherein a path congestion prediction regarding the expected congestion level on a path is derived from said aggregated congestion,
    wherein network-generated hints are provided, said hints including said path congestion prediction,
    wherein said network-generated hints are disseminated to network elements and/or end hosts, and
    wherein said network-generated hints are employed for assisting said end hosts in events of mobility.

2. The method according to claim 1, wherein said aggregated congestion is determined by calculating a fraction of congestion marked packets, in particular in the downlink direction.

3. The method according to claim 2, wherein said aggregated congestion is determined by summing up a number of congestion marked packets over a predefined time period, in particular in the downlink direction.

4. The method according to claim 1, wherein said aggregated congestion is determined by summing up a number of congestion marked packets over a predefined time period, in particular in the downlink direction.

5. The method according to claim 1, wherein said congestion information includes Re-ECN-specific markings.

6. The method according to claim 1, wherein said deriving of the path congestion prediction regarding the expected congestion level on the path includes calculating a path congestion prediction factor.

7. The method according to claim 6, wherein said network-generated hints are employed for assisting said end hosts during handover events.

8. The method according to claim 7, wherein said network-generated hints are employed for adjusting congestion response at said end hosts.

9. The method according to claim 6, wherein said network-generated hints are employed for adjusting congestion response at said end hosts.

10. The method according to claim 1, wherein said network-generated hints are disseminated to mobility management entities in order to influence mobility management decisions.

11. The method according to claim 1, wherein the computation of said network-generated hints is isolated among individual network elements for constructing a local congestion view indicating congestion between a subset of nodes on a path.

12. The method according to claim 11, wherein said local congestion view is represented as fraction.

13. The method according to claim 11, wherein local congestion views for subsets along said path are combined to generate a global congestion view in order to predict congestion for the complete path.

14. The method according to claim 1, wherein accuracy information regarding the computation of said network-generated hints are signaled together with said hints.

15. The method according to claim 1, wherein the communication of said network-generated hints is performed by exchanging said hints on the air interface of a network element, to the interface of a host.

16. The method according to claim 15, wherein said hints are exchanged on the air interface of the network element of an eNodeB to the interface of a mobile node.

17. The method according to claim 1, wherein the communication of said network-generated hints is performed by employing ICMP control messages.

18. A congestion exposure-enabled network system, said system comprising:
    sending hosts;
    receiving hosts; and
    intermediate routers,
    wherein said sending hosts and said receiving hosts communicate with each other by sending flows of packets over network paths via said intermediate routers, which, upon detecting congestion, mark packets of said flows as congestion packets by including congestion information,
    wherein a congestion feedback mechanism is provided being configured to indicate congestion to the sending hosts, and
    wherein the sending hosts, upon receiving congestion indications, declare a subset of the packets they send as congestion response packets by including congestion information, depending on whether the amount of congestion response packets is balanced with the indicated congestion level or not,
    wherein said network system is further configured
    i) to determine aggregated congestion on the basis of congestion information included in packets that are sent over said network paths between said sending hosts and said receiving hosts
    ii) to derive a path congestion prediction regarding an expected congestion level on a path from said aggregated congestion,
    iii) to provide network-generated hints including said path congestion prediction, and
    iv) to disseminate said network-generated hints to network elements and/or end hosts,
    wherein said network-generated hints are employed for assisting said end hosts in events of mobility.

19. An intermediate router for use in a congestion exposure-enabled network that includes sending hosts and receiving hosts in communication with each other by sending flows of packets over network paths, said intermediate router comprising:
    network interfaces respectively in communication with said network paths, said sending hosts and said receiving hosts in communication with each other via said network interfaces of said intermediate router,
    wherein said intermediate router is configured to, upon detecting congestion, mark packets of said flows as congestion packets by including congestion information,
    wherein a congestion feedback mechanism is provided being configured to indicate congestion to the sending hosts,
    wherein the sending hosts, upon receiving congestion indications, declare a subset of the packets they send as congestion response packets by including congestion information, depending on whether the amount of congestion response packets is balanced with the indicated congestion level or not,
    wherein said intermediate router is further configured to determine aggregated congestion on the basis of congestion information included in packets that are sent over said network paths via said intermediate router between said sending hosts and said receiving hosts,
    wherein a path congestion prediction regarding an expected congestion level on a path is derived from said aggregated congestion,
    wherein network-generated hints including said path congestion prediction are provided,
    wherein said network-generated hints are disseminated to network elements and/or end hosts, and
    wherein said network-generated hints are employed for assisting said end hosts in events of mobility.

* * * * *